Patented Feb. 10, 1953

2,628,162

UNITED STATES PATENT OFFICE 2,628,162

METHOD FOR INHIBITING PRECIPITATION OF 2,4-D SALTS IN HARD WATER

Herbert L. Sanders, Chicago, Ill., and Raymond L. Mayhew, Phillipsburg, N. J., assignors to General Aniline & Film Corporation, New York, N. Y., a corporation of Delaware No Drawing. Application December 29, 1950, Serial No. 203,572

6 Claims. (Cl. 71—2.6)

The present invention relates to a method for inhibiting precipitation of 2,4-D salts in hard water and to a composition for the purpose.

2,4-dichlorophenoxy acetic acid (2,4-D) has been marketed as a weed killer in the form of water insoluble esters such as the propyl and butyl esters and also in the form of water soluble salts such as the sodium and amine salts. At the present time the trend seems to be towards greater use of the amine salts. One of the problems connected with the use of these salts is the fact that they are often dissolved in hard water and precipitation of the sparingly soluble calcium salt of 2,4-D results, with consequent clogging of the spray nozzles. Most surface active agents as additives to retard this precipitation are relatively ineffective, including all of the nonionics, alkyl naphthalene sulfonates, etc. By ineffective is meant that solutions containing 2.4% 2,4-D (calculated as the free acid) in water of 1000 p. p. m. hardness will form a precipitate within an hour or so even in the presence of about 0.1% of the surface active agent. On the other hand, effective compounds would be those showing no precipitate even after 24 hours.

It is an object of the present invention to provide a method and composition for inhibiting precipitation of 2,4-D salts in hard water.

It is a further object of the present invention to provide an improved process for inhibiting precipitation of 2,4-D salts in hard water by the use of a specific surface active agent.

These and other objects of the present invention are attained by the method which comprises adding to the water soluble salts of 2,4-D a surface active agent having the following formula:

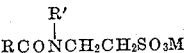

wherein R is selected from a group consisting of a rosin acid residue and a mixture of rosin acid and fatty acid residues, wherein R' is selected from the group consisting of hydrogen and methyl group, and M is selected from the group consisting of alkali metals and amines.

In general, these compounds may be described as tall oil N-acyl taurates. Any of a wide variety of tall oils may be used from those which are substantially rosin acids to those which contain a large proportion of fatty acids and a smaller proportion of rosin acids, but preferably the tall oil containing about 70% rosin acids and 30% unsaturated fatty acids is used. The amount of the surface active agent may be varied widely but is preferably in the range 0.1 to 2.0% based upon the amount of 2,4-D. The taurate surface active agent is prepared by the method of U. S. Patent 1,932,180.

In the following example "taurate" refers to the sodium methyl taurate reaction product with a tall oil containing 70% rosin acids and 30% unsaturated fatty acids (Neofat D-242, Armour & Co.). The example is illustrative of a preferred embodiment of the invention but variations and substitutions may be made within the scope of the claims.

Example

A 2,4-D "concentrate" was prepared having the following composition:

67% triethanolamine salt of 2,4-D
33% distilled water 6 parts of this concentrate were then added to 95 parts of water of 1000 p. p. m. hardness with vigorous stirring at room temperature. Within about ten minutes a heavy flocculent precipitate formed throughout the solution.

A similar concentrate was then made up having the following composition:

67% triethanolamine salt of 2,4-D
0.5% taurate
32.5% distilled water

On diluting with 1000 p. p. m. water as above, the solutions remained practically clear and no visible precipitate formed even after standing for four days.

The same results were found using concentrates containing the isopropanol amine salts of 2,4-D.

Another tall oil product quite similar to the preceding was made using Armour Neofat S-142 which is a mixture of 12% rosin acids and 88% unsaturated fatty acids. The sodium salt of this product also showed good protective action for the 2,4-D amine salts, except that about 1.5% of the pure surface active agent was required instead of 0.5% as before.

Another requirement for protective agents is that the concentrates containing the inhibitor show no sedimentation on cooling to low temperatures. It was found that the sodium salts of these inhibitors tended to sludge out slightly under these conditions and the potassium salts were therefore also prepared and showed better resistance to low temperature. This would be expected since the sludge is believed to be the sodium salt of 2,4-D which is formed by interchange. The potassium salt of 2,4-D is much more soluble than the sodium salt, and would therefore be expected to give less precipitation.

We claim:

1. A process for inhibiting the precipitation of up to 2.4% concentrations calculated as the free acid of 2,4-dichlorophenoxyacetic acid salts in hard water which comprises adding thereto from 0.1 to 2.0% by weight of the 2,4-dichlorophenoxyacetic acid of a compound having the formula

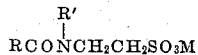

wherein R is selected from a group consisting of a rosin acid residue and a mixture of rosin acid and fatty acid residues, wherein R' is selected from the group consisting of hydrogen and methyl group, and M is selected from the group consisting of alkali metals and amines.

2. A new composition of matter comprising water, a soluble salt of 2,4-dichlorophenoxyacetic acid and from 0.1 to 2.0% by weight based on the 2,4-dichlorophenoxyacetic acid of a compound of following formula:

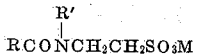

wherein R is selected from a group consisting of a rosin acid residue and a mixture of rosin acid and fatty acid residues, wherein R' is selected from the group consisting of hydrogen and methyl group, and M is selected from the group consisting of alkali metals and amines.

3. A new composition of claim 2 wherein the formula compound is a tall oil N-acyl taurate.

4. A new composition of claim 2 wherein the formula compound is rosin acid N-acyl taurate.

5. A new composition of claim 2 wherein the formula compound is a carboxylic acid N-acyl taurate of a mixture of about 70% rosin acids and 30% unsaturated fatty acids.

6. A new composition of claim 2 wherein the salt is the potassium salt of 2,4-dichlorophenoxyacetic acid.

HERBERT L. SANDERS.
RAYMOND L. MAYHEW.

REFERENCES CITED

The following references are of record in the file of this patent:

UNITED STATES PATENTS

| Number | Name | Date |
|---|---|---|
| 1,932,180 | Guenther et al. | Oct. 24, 1933 |
| 2,390,941 | Jones | Dec. 11, 1945 |
| 2,519,780 | Morrill | Aug. 22, 1950 |

OTHER REFERENCES

Agricultural Chemicals—April 1949, pp. 27 to 29 and 73.